United States Patent [19]

Greig

[11] 4,423,505
[45] Dec. 27, 1983

[54] CUED ADAPTIVE CANCELLER

[75] Inventor: John H. Greig, Massapequa, N.Y.

[73] Assignee: Loral Corp., Yonkers, N.Y.

[21] Appl. No.: 323,867

[22] Filed: Nov. 23, 1981

[51] Int. Cl.$^3$ .............................................. H04B 1/56
[52] U.S. Cl. ........................................ 370/32; 455/79
[58] Field of Search ............... 370/24, 28, 32; 455/78, 455/79, 80, 81, 82

[56] References Cited

U.S. PATENT DOCUMENTS

| | | | |
|---|---|---|---|
| 3,696,429 | 10/1972 | Tressa .................................... | 370/32 |
| 3,699,444 | 10/1972 | Ghose et al. .......................... | 455/79 |
| 3,810,182 | 5/1974 | White et al. ........................... | 455/79 |

Primary Examiner—Benedict V. Safourek
Attorney, Agent, or Firm—Charles E. Temko

[57] ABSTRACT

An adaptive canceller construction for cancelling signals received by a radio receiver operating in close proximity to a transmitter having means for extending the usefulness of the device over a wide band of frequencies. The canceller is provided with a memory which will remember the adopted parameter from one time in a given band to the next, so that as a jammer frequency jumps back and forth among several narrow frequency bands, the canceller will jump among a corresponding set of remembered parameters.

3 Claims, 3 Drawing Figures

DIGITAL IMPLEMENTION

ANALOG IMPLEMENTION AT IF

CUED ADAPTIVE CANCELLER

BACKGROUND OF THE INVENTION

There are many examples of a need to operate a radio receiver and transmitter in close proximity. Often the isolation between antennas cannot be provided by passive means such as physical separation or by antenna directivity. It is known in the art to improve isolation by the use of an adaptive canceller. The present invention deals with means for extending the usefulness of adaptive cancellers over a wide band of frequencies.

It is often desirable to provide a canceller capable of adapting to several narrow frequency bands independently resulting in wide band coverage. For example, when a surveillance receiver and a jammer are operated on a small aircraft, the jammer may be switched rapidly over a wide band of frequencies including the coverage band of the receiver. The canceller adapted to one such frequency might have to readapt when the jammer jumps to another frequency.

SUMMARY OF THE INVENTION

Briefly stated, the invention contemplates the provision of a canceller having a memory so that the canceller will remember the adapted parameters from one time in a given band to the next. Thus, as the jammer frequency jumps back and forth among several narrow frequency bands, the canceller will jump among a corresponding set of remembered parameters. Each time that the jammer returns to a frequency band, the canceller will use the parameters associated with that band, and update them as required.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 1:
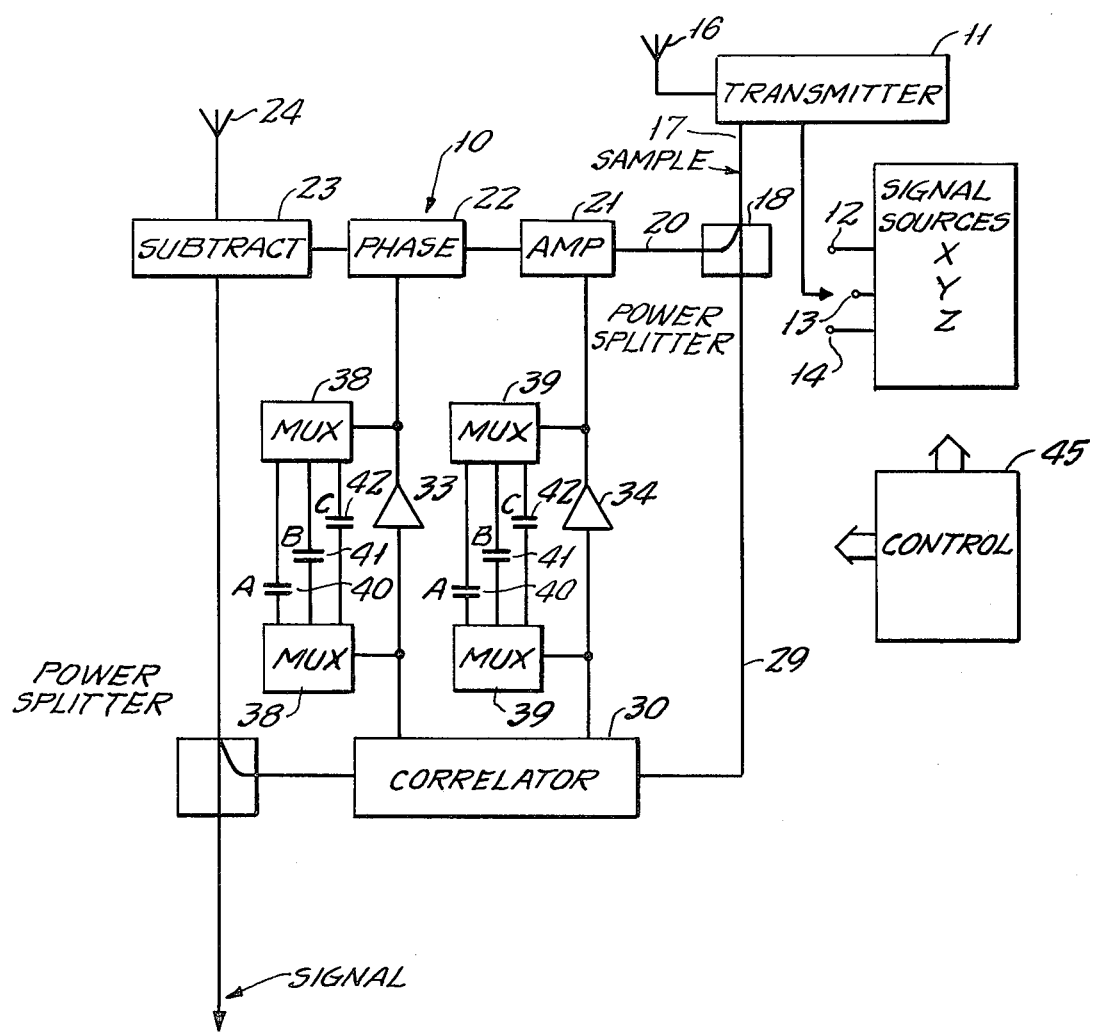
FIG. 1 is a schematic view of a first embodiment of the invention.

In accordance with the first embodiment of the invention, generally indicated by reference character 10, reference is made to FIG. 1 in the drawing. A radar transmitter 11 is selectively fed from a plurality of signal sources 12, 13 and 14, usually each source covering only a narrow frequency band. Three signal sources are illustrated, but it will be understood that as many sources as are necessary may be employed with corresponding modification of structure. The transmitter 11 broadcasts through an antenna 16, and provides a sample signal tap 17 leading to a power splitter 18.

From the power splitter 18, a first branch 20 leads to an amplitude control 21, a phase control 22, and a signal subtractor 23 in series with a receiving antenna 24. A second branch 29 leads to a cross correlator 30. The other input to this cross correlator is a sample of the output signal from a second power splitter 31.

Interconnecting the correlator 30 with the phase control 22 is a first filter incorporating a servo amplifier 33, and a capacitor. For purposes of clarity the servo filter is represented as a single integrator employing one capacitor 40, 41 or 42. A second similar filter employing amplifier 34 interconnects the cross correlator with the amplitude control 21.

Connected in parallel with each of the filters 33 and 34 are parameter multiplexers at 38 and 39. Each of the multiplexers 38 and 39 selectively interconnect first, second and third sets of capacitors 40, 41 and 42. Control logic 45 controls the operation of the multiplexers, and selection of the signal sources 12–14, inclusive, for operation in synchronism.

Operation of the device will be apparent from a consideration of FIG. 1. The outputs of the filters 33 and 34 represent a complex number, or weight. When the sample of the transmitter signal multiplied by this weight is subtracted from the receiver channel, the interference should be cancelled. If it is not completely cancelled, the remainder is correlated with the transmitter sample to provide error signals into the filters.

The active servo filters store instantaneous voltages as charges on capacitors. These capacitors are multiplexed in sets by the parameter multiplexer. As long as the multiplexer has selected a set, A, of capacitors, the servo amplifier will set the charges on these capacitors to produce a set of weights. If the multiplexer is then switched to another set, B, of identical capacitors, the servo would produce the same weights after a transient has died out. If the multiplexer setting is now returned to capacitor set, A, the retained charge will produce nearly the correct weight without a transient.

The transmitter is excited from one of several signal sources through a multiposition switch. The control circuit logic operates this switch as required for the proper operation of the transmitter. These signal sources will, in general, be centered at widely different frequencies. They may also be associated with different beam steering positions of the transmitting antenna. It is to be noted that these switches are operated by a sequence externally imposed on the transmitting system, so that a prescience of the switch position is always available.

In particular, the cued system is of value when there is a difference in path length between the two cancelling paths of the loop. For example, consider a canceller loop in which the path of the interference voltage and the path of the reference voltage differ by a relatively small distance. The complex numbers representing the interference, Vi, and the reference, Vr, are:

$$Vi = A \exp(2\pi j f(T+t))$$

$$Vr = B \exp(2\pi j f T)$$

where A and B are amplitudes, f is frequency and T and t are time delays. The complex weight computed or approximated by the active canceller is:

$$W = \frac{\overline{Vi\, Vr^*}}{\overline{Vr\, Vr^*}} = \frac{AB}{B^2} \exp(2\pi j f t)$$

A bar over a quantity indicates "the mean of" and an * indicates "the complex conjugate".

If this canceller loop were operating with correct weights at one frequency and the interference jumped suddenly to $f + \Delta f$, the phase angle error would be:

$$\Delta \phi = 2\pi t \Delta f$$

This error would be corrected by the canceller loop servo. It would leave a transient interference voltage starting at a cancellation ratio in dB of:

$$e = 20 \log 2\pi t \Delta f$$

For a path length error of 1 cm and a frequency jump of 1 GHz the cancellation ratio would be only −13 dB at the start of this transient. If the change in frequency was made by a continuous sweep, the loop servo might keep up with the changing frequency maintaining a better cancellation ratio. If a jump or large change in frequency is produced by switching the transmitter input a corresponding switch in filter parameters would follow the charge and maintain good cancellation.

If the transmitter is operating at a nearly constant amplitude and frequency very near to a constant frequency signal, it is possible that the servo bandwidth is wide enough to cancel the desired signal. If any of the signal sources might be used in this manner, it is possible to have a set of capacitors to be used for this type of signal with a narrow servo bandwidth. This ability to change the servo bandwidth to use a narrow servo on a narrow band and a wide servo on wide band signals constitutes a second advantage of the queing technique.

Referring again to the function of the servo filters in the canceller loop, it may be readily seen that the control logic may assign a set of filter capacitors to each signal source which might produce a signal within the receiver bandpass. For example, two signal sources may be producing narrow band pulse or noise like signals centered at extreme ends of the receiver band. The logic might assign capacitor set A to the low frequency, X, signal; and capacitor set B, to the high frequency, Y, signal. The control logic will then connect capacitor set A, every time source X is used and will connect capacitor set B, every time source Y is used. With this procedure, the servo filter bandpass may be relatively narrow. There is no need to recover from a transient during each transmitted pulse.

Turning now to the second embodiment of the invention, it differs from the first embodiment in the provision of a microprocessor and digital filters. The output of the correlator is digitized and the phase and amplitude is digitally controlled.

This implementation allows for a large number of servo filters at only the cost of additional memory in the processor. The possibility of using different bandpass servo filters for different sources is thus implemented by software. Further, the servo filters can be implemented with time varying bandpass to speed the recovery from initial transients.

Figure 2:
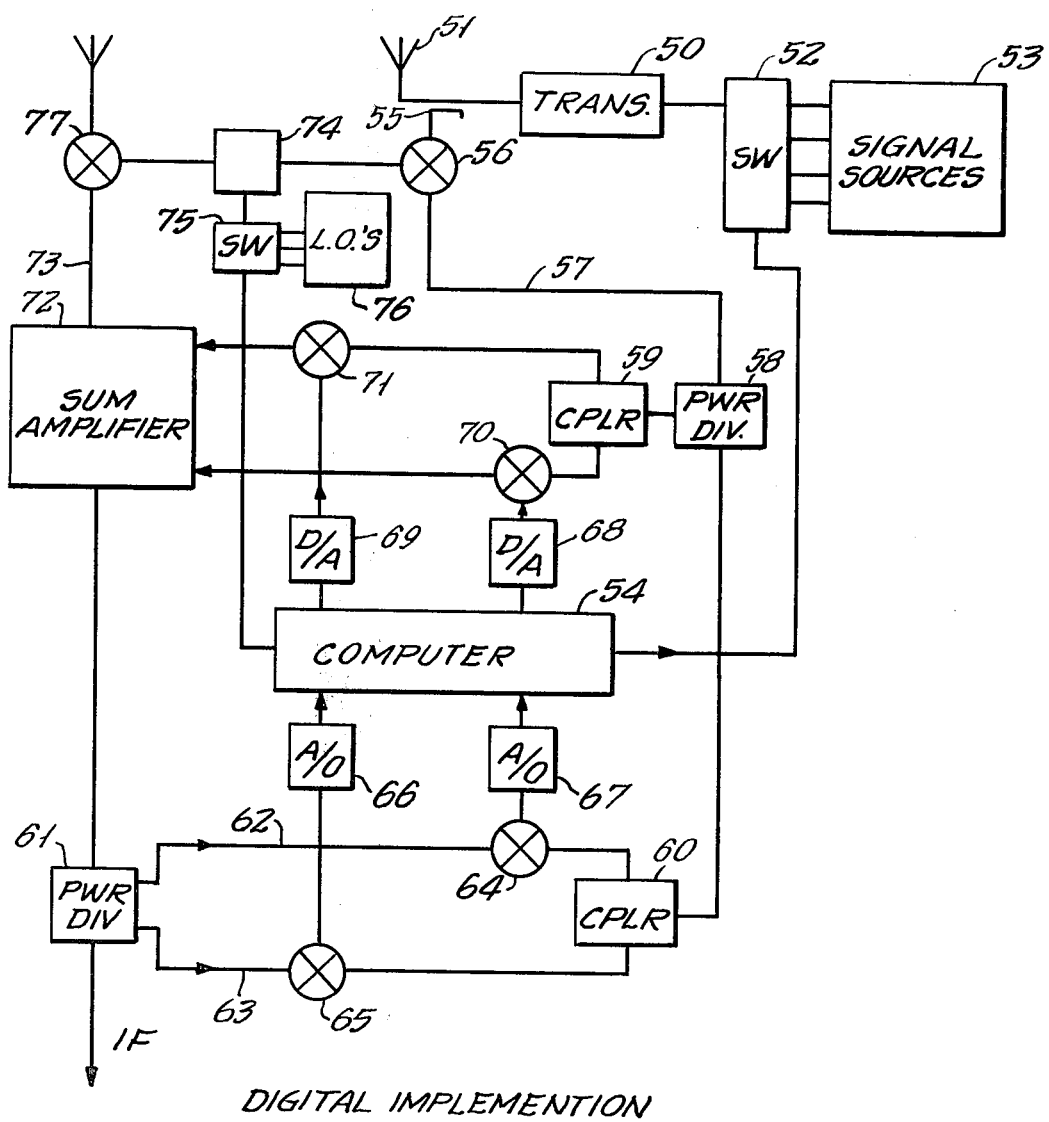
FIG. 2 is a schematic view of a second embodiment of the invention.
Figure 3:
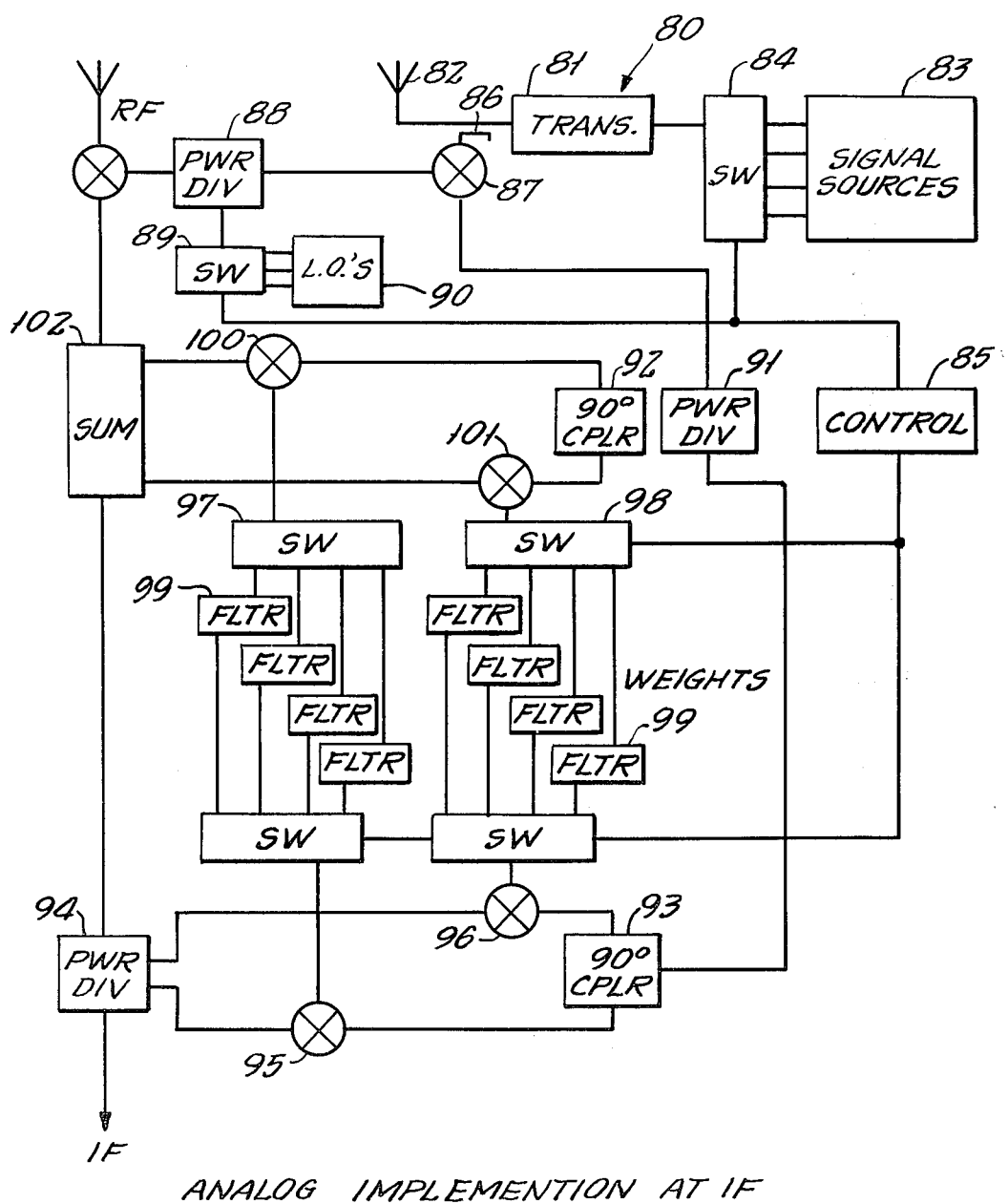
FIG. 3 is a schematic view of a third embodiment of the invention.

Referring now to FIG. 2 in the drawing, the second embodiment comprises a transmitter 50 and transmitting antenna 51, the transmitter being fed through a switch 52 from any one of plural signal sources 53. The switch 52 is controlled by a computer 54 in known manner. A signal coupler 55 receives a sample of the signal emanating from a source 53. This sample passes through a mixer 56 a conductor 57 to a power divider 58 feeding a pair of couplers 59 and 60. A power divider 61 feeds error signals through lines 62 and 63 to mixers 64 and 65, respectively, which feed analog to digital converters 66 and 67 to provide inputs to the computer 54.

The outputs of the computer 54 pass through digital to analog converter 68 and 69 and mixers 70 and 71 to a summing device 72 in series with the receiving channel 73.

Mixers 77 and 56 are included in this implementation to illustrate that the cancellor might be implemented at an intermediate frequency in a superhetrodyne. It might be supplied by anyone of a set of local oscillators 76 through the switch 75 and the local oscillator signal is supplied through power divider 74 to the mixers 56 and 77. Thus the IF signal sample of interference out of mixer 56 is coherent with the interference at IF out of mixer 77.

Turning now to the third embodiment, the transmitter 81 feeds a transmitting antenna 82 from plural signal sources 83 under the control of a switch 84, the operation of which is governed by control logic 85. A signal coupler 86 feeds a mixer 87 connected to a power divider 88 receiving an input from a switch 89 selectively interconnecting one of a plurality of local oscillators 90, the switch being under the control of logic circuitry 85.

A power divider 91 feeds a pair of couplers 90. A power divider 94 provides an error signal to mixers 95 and 96 feeding switches 97 and 98 which selectively connect a desired filter 99. The switches 97 and 98 are connected to mixers 100 and 101, respectively, feeding a summing device 102 in a manner similar to that of the second embodiment.

I wish it to be understood that I do not consider the invention limited to the precise details of structure shown and set forth in this specification, for obvious modifications will occur to those skilled in the art to which the invention pertains.

I claim:

1. A cued adaptive canceller for use in conjunction with a radio receiver and a radio transmittor simultaneously operated in close proximity for cancelling reception of transmitted signals comprising: a cancelling loop including a connection to said transmittor to input sample transmitted signals, a phase control an amplitude control and a subtractor; said subtractor connected to an input to said receiver, and a cross correlator having an input of received signals; first and second filters interconnecting the output of said cross correlator and said phase control and said amplitude control, respectively; a parameter multiplexer connected in parallel with each of said filters, and a plurality of capacitors each selectively interconnected in parallel with a respective filter by operation of one of said multiplexers; and control means for governing operation of said multiplexers.

2. A cued adaptive canceller in accordance with claim 1, in combination with a transmitter having selectively interconnectable plural signal sources of varying frequencies, and control means for interconnecting selected ones of said plural signal sources to said transmitter; said first mentioned control means assigning specific frequencies of said plural signal sources to specific individual condensors connected by said first and second multiplexers.

3. A cued adaptive canceller in accordance with claim 1, further characterized in said first and second filters being of digital type, said canceller further comprising a microprocessor, said canceller filters being implemented in the microprocessor, the filter parameters being stored in computer memory; wherein the output of said cross correlator is digitized and the phase and amplitude of a sample signal is digitally controlled.

* * * * *